(12) United States Patent
Xu et al.

(10) Patent No.: US 8,200,691 B2
(45) Date of Patent: Jun. 12, 2012

(54) ACTION PREDICTION BASED ON INTERACTIVE HISTORY AND CONTEXT BETWEEN SENDER AND RECIPIENT

(75) Inventors: Tian Xu, Shanghai (CN); Eckhard Farrenkopf, Schriesheim (DE); Dirk Saager, Karlsruhe (DE); Andre Eichhorst, Ladenburg (DE)

(73) Assignee: SAP AG, Walldorf (DE)

( * ) Notice: Subject to any disclaimer, the term of this patent is extended or adjusted under 35 U.S.C. 154(b) by 1123 days.

(21) Appl. No.: 11/606,806

(22) Filed: Nov. 29, 2006

(65) Prior Publication Data

US 2008/0126310 A1    May 29, 2008

(51) Int. Cl.
  *G06F 17/30* (2006.01)
(52) U.S. Cl. .................. 707/769; 379/265.09
(58) Field of Classification Search .......... None
  See application file for complete search history.

(56) References Cited

U.S. PATENT DOCUMENTS

| | | | | |
|---|---|---|---|---|
| 2002/0188497 | A1* | 12/2002 | Cerwin | 705/10 |
| 2004/0169675 | A1* | 9/2004 | Beck et al. | 345/705 |
| 2005/0069123 | A1* | 3/2005 | Castro et al. | 379/265.09 |
| 2006/0002540 | A1* | 1/2006 | Kreiner et al. | 379/265.02 |
| 2006/0056385 | A1* | 3/2006 | Fotta et al. | 370/351 |
| 2006/0173772 | A1* | 8/2006 | Hayes et al. | 705/37 |
| 2006/0218499 | A1* | 9/2006 | Matthews et al. | 715/765 |
| 2006/0259603 | A1* | 11/2006 | Shrader et al. | 709/223 |
| 2007/0192122 | A1* | 8/2007 | Routson et al. | 705/1 |
| 2007/0299713 | A1* | 12/2007 | Macbeth et al. | 705/9 |

* cited by examiner

*Primary Examiner* — Neveen Abel Jalil
*Assistant Examiner* — Kevin L Young
(74) *Attorney, Agent, or Firm* — Mintz, Levin, Cohn, Ferris, Glovsky & Popeo, P.C.

(57) ABSTRACT

Techniques for action prediction based on interactive history and context between a sender and a recipient are described herein. In one embodiment, a process includes, but is not limited to, in response to a message to be received by a recipient from a sender over a network, determining one or more previous transactions associated with the sender and the recipient, the one or more previous transactions being recorded during course of operations performed within an entity associated with the recipient, and generating a list of one or more action candidates based on the determined one or more previous transactions, wherein the one or more action candidates are optional actions recommended to the recipient, in addition to one or more actions required to be taken in response to the message. Key word identification out of voice applications as well as guided actions has also been applied to generate action prediction candidates interactive history links Other methods and apparatuses are also described.

19 Claims, 12 Drawing Sheets

Related Links

Customer Profile
Lead Overview
Opportunity Overview
Sales Contract
Sales Quotes
Sales Order          502
Sales Return
Delivery Notification
Shipping Confirmation
Invoice
Dunning Proposal
Complaint

Actions to be taken

New Account Person
New direct mail
New Leads
New Opportunity     501
New Sales Contract
New Sales Quotes
New Sales Order
Create delivery notification
New Invoice
New Complaint
Confirmation of Shipping
New Invoice

Fig. 5

Related Links
Customer Profile
Lead Overview
Opportunity Overview
Sales Contract
Sales Quotes
Sales Order    1001
Sales Return
Delivery Notification
Shipping Confirmation
Invoice
Dunning Proposal
Complaint

You Can Also
New Account Person
New direct mail
New Leads    1002
New Opportunity
New Sales Contract
New Sales Quotes
New Sales Order
Create delivery notification
New Invoice
New Complaint
Confirmation of Shipping
New Invoice

Fig. 10

ACTION PREDICTION BASED ON INTERACTIVE HISTORY AND CONTEXT BETWEEN SENDER AND RECIPIENT

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to data processing. More particularly, this invention relates to action prediction based on sender and recipient relationship.

BACKGROUND

While a business user interacts between multiple parties (e.g., receiving an incoming calls from customers), the business user would like to view the interactive history between the user and the customer, in order to be prepared at all times during the communication process. However, in the real world, the user can only check on a Web site by clicking several buttons across different Web pages. In addition, the completed customer related links can not be found.

Business context of a phone communication is closely related to specific topics discussed between both partners (e.g., sender and recipient). A topic is normally initiated by one of the partners and may change to another topic as necessary. According to market analysis, the topics among fixed communication partners are relatively stable. However, such related information is normally not available in a conventional communications system which can only let user search the customer related information manually and in a fragment.

In addition, when users receive an incoming call from a customer, the users would like the system to generate action links that would directly trigger actions to the customers instead of accessing a portal, and opening OIF (E.g., several web pages which may be at different applications) and having to input related customer data. Such a system would increase user productivity. However, in a conventional system, a user can only check in a portal by taking several steps, which would deem very low productivity.

SUMMARY OF THE DESCRIPTION

Techniques for action prediction based on interactive history and context between a sender and a recipient are described herein. In one embodiment, a process includes, but is not limited to, in response to a message to be received by a recipient from a sender over a network, determining one or more previous transactions associated with the sender and the recipient, the one or more previous transactions being recorded during course of operations performed within an entity associated with the recipient, and generating a list of one or more action candidates based on the determined one or more previous transactions, wherein the one or more action candidates are optional actions recommended to the recipient, in addition to one or more actions required to be taken in response to the message.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 5 is a diagram illustrating an example of business context according to one embodiment of the invention.

FIG. 10 is a diagram illustrating an example of business context according to another embodiment of the invention.

DETAILED DESCRIPTION

Figure 1:
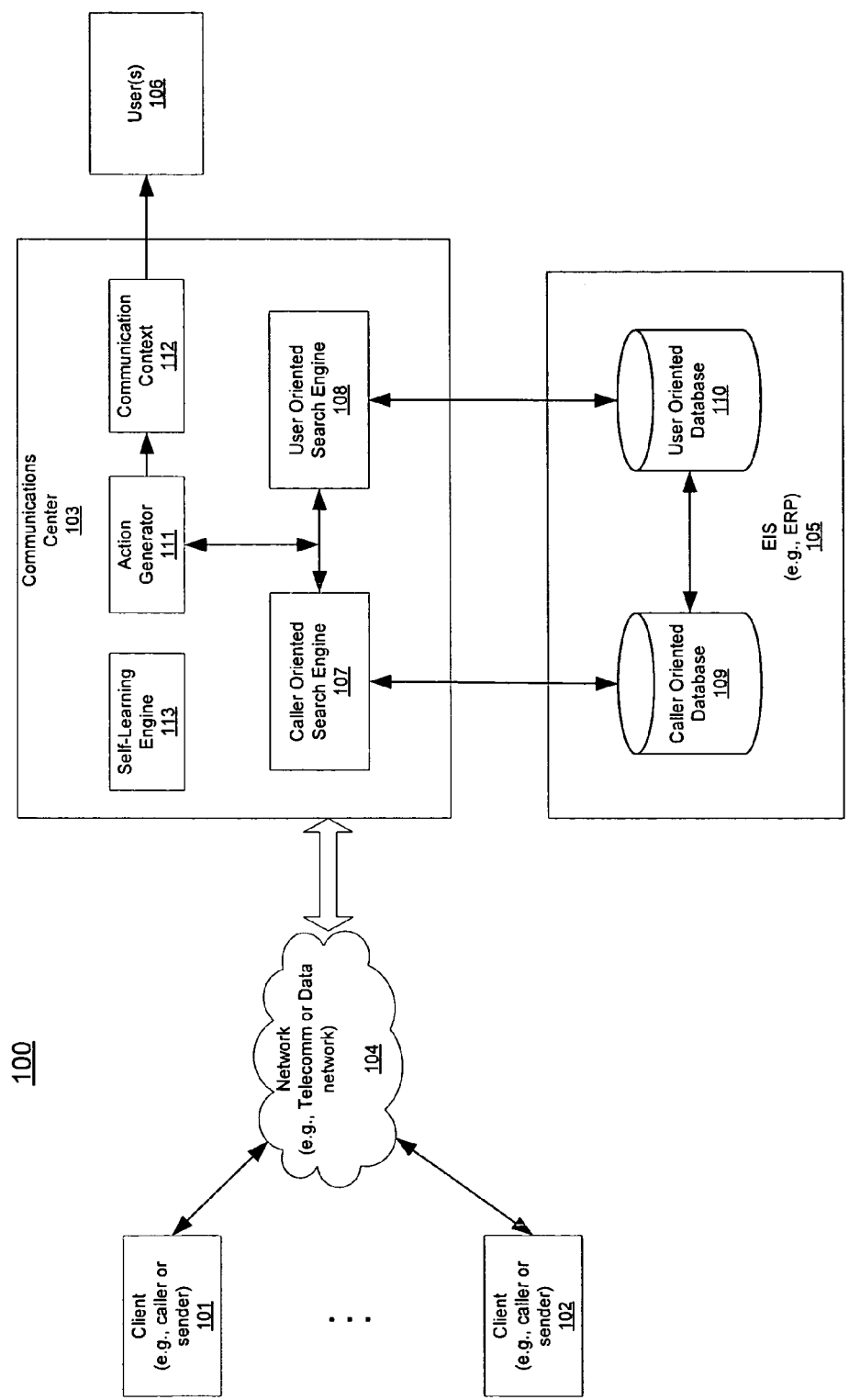
FIG. 1 is a block diagram illustrating a system configuration for handling a communication message according to one embodiment of the invention.

Techniques for action prediction based on interactive history and context between a sender and a recipient are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Accordingly, certain techniques are introduced to process an incoming call or message in view of information provided by an enterprise information system (EIS) such as enterprise resource planning (ERP) associated with an enterprise entity or organization, including generating a proper context associated with the caller or sender, identifying a proper user or recipient to handle the incoming call or message, and providing suggestions or predicting certain further actions that may be performed.

Sender Oriented and User Oriented Action Generation

Accordingly, business context is built upon call attendees (e.g., a sender and a recipient of a message, or a caller and a recipient of a phone call). Thus, there are sender (e.g., caller) oriented and/or user (e.g., recipient) oriented for two parties who are involved in the communications such as a phone call. In one embodiment, business context is collected based on two centers, one based on the sender and the other one based on the recipient or potential recipients. Throughout this application, a phone call is used as an example of communications between a sender (e.g., a caller) and a recipient (also referred to as a user herein). However, it is not so limited; other types of communications (e.g., emails or instant messaging, etc.) may also be applied.

In one embodiment, an interactive history (e.g., related links of business context from previous transactions) generator is built using a user oriented search engine as well as a caller oriented search engine. The user oriented search engine is configured to search user related links from a user work center and/or floor plan of an organization or enterprise entity. Business object (BO) related links may be extracted based on one or more rules (e.g. the most frequent used links). In one embodiment, the caller oriented search engine is configured to search the user/caller related links from the caller interactive history recorded by a caller transaction database or by a self-learning engine based on previous transactions. The user related links may further be extracted based on one or more rules (e.g. the most frequent related links that the caller interacted with the respective user previously). In a further embodiment, additional functionalities may be implemented into the system including a selection mechanism to allow a user to select user oriented or caller oriented related links, and a configuration unit (e.g., business configurations) to the configure user oriented or caller oriented business contexts.

FIG. 1 is a block diagram illustrating a system configuration for handling a communication message according to one embodiment of the invention. In one embodiment, system 100 includes, but is not limited to, a processing logic, in response to a message to be received by a recipient from a sender over a network, to determine one or more previous transactions associated with the sender and the recipient, the one or more previous transactions being recorded during course of operations performed within an entity associated with the recipient, and an action generator coupled to the processing logic to generate a list of one or more action candidates based on the determined one or more previous transactions, such that the recipient is able to select one or more of the action candidates to be performed for responding the message of the sender.

Referring to FIG. 1, system 100 includes one or more clients 101-102 communicatively coupled to a server 103 over a network 104. For the purposes of illustration, clients 101-102 are callers communicatively coupled to a communication center 103 which may be a call center associated with an organization or enterprise entity. For example, callers 101-102 may be customers of an enterprise entity owning and/or operating communication center 103. One or more users 106 may be employees or customer representatives of the enterprise entity. The users 106 may be receiving calls from callers 101-102 over a network, which may be a PSTN (public switch telephone network) or a data network (e.g., Internet using voice over IP or VoIP technologies).

In one embodiment, communication center 103 may be communicatively coupled to an enterprise information system (EIS) 105 associated with the enterprise entity. Referring back to FIG. 1, in one embodiment, server 103 may include an action generator 111 coupled to a caller oriented search engine 107 and user oriented search engine 108, in response to an incoming call received from a caller (e.g., callers 101-102) over a network, to generate a communication context 112 that is related to a caller and/or a potential user 106 (e.g., a recipient) who handles the incoming call.

In one embodiment, in response to an incoming call, caller oriented search engine 107 and/or user oriented search engine 108 perform a search or searches within one or more databases (e.g., databases 109-110) for storing information regarding business transactions associated with the caller and/or potential users. For example, a search engine may search and identify one or more users that may be suitable for handling an incoming call of a particular caller based on certain factors associated with the caller and/or the users.

In one embodiment, caller oriented search engine 107 may access a respective caller oriented database 109 and user oriented search engine 108 may access a respective user oriented database 110. Databases 109-110 may be maintained by an enterprise information system (EIS), which may be an ERP system. Note that databases 109 and 110 are shown for the purposes of illustration only, where they may be a single database or multiple databases. In addition, search engines 107-108 may be part of EIS 105 dependent upon specific implementations. Furthermore, server 103 and EIS 105 may be implemented as the same server or a cluster of servers. Similarly, search engines 111-112 may be the same search engine searching in the same database or different databases. Other configurations may exist. User oriented database can be turned to a caller oriented database which the user is at the position of a caller in an incoming call, similar to a caller oriented database. The core properties of user/caller oriented database are: it is a database can store all business transactions during the communication, and can fulfill the people oriented search for related functions. Further more, based on the first search at user or caller oriented business transactions, the search may normally takes another step to further filter the business transactions which is related with the user or caller's counterpart.

In one embodiment, in response to an incoming call, caller oriented search engine 107 generates a call context (e.g., business related context) associated with the caller based on the incoming call including, for example, caller's name and phone number, as well as a type of business associated with the caller, etc.

In addition, according to one embodiment, in response to an incoming call, caller oriented search engine 107 searches within caller oriented database 109 for any information related to previous transaction between the caller and the enterprise entity associated with the communication center 103 and/or EIS 105. Based on the information as a result of the search, a first business context associated with the caller's previous transactions on related links is generated. This is a caller oriented business context database.

Further, according to another embodiment, in response to the incoming call, user oriented search engine 108 searches within the identified caller oriented database 110 based on the operation before. Based on the information as a result of the search, a second business context associated with the caller and the user's previous activities on related links is generated.

Based on the second business contexts, a user who handles the incoming call may utilize one or both of the related link contexts (e.g., related link context 502 of FIG. 5), in addition to the general context associated with the caller (e.g., action context 501 of FIG. 5), to handle the incoming call. In a further embodiment, the related link context may be generated by a self-learning engine based on the business contexts extraction algorithm which will ensure the high frequently used business transactions will be generate first than the other low frequently used business context. The self-learning engine may perform such a determination based on one or more rules. Note that some or all of the functional units associated with server 103 and 105 may be implemented in software, hardware, or a combination of both. Other configurations may exist.

Figure 2:
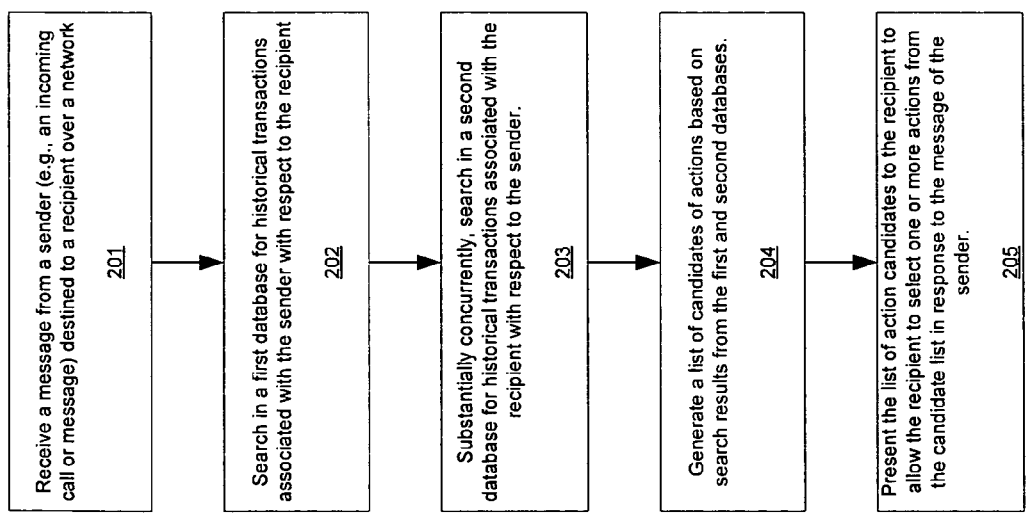
FIG. 2 is a flow diagram illustrating a process for processing an incoming call according to one embodiment of the invention.

FIG. 2 is a flow diagram illustrating a process for processing an incoming call according to one embodiment of the invention. Note that process 200 may be performed by processing logic which may include software, hardware, or a combination of both. For example, process 200 may be performed by one or more functional units of system 100 of FIG. 1. In one embodiment, process 200 includes, but is not limited to, in response to a message to be received by a recipient from a sender over a network, determining one or more previous transactions associated with the sender and the recipient, the one or more previous transactions being recorded during course of operations performed within an entity associated with the recipient, and generating a list of one or more action candidates based on the determined one or more previous transactions, such that the recipient is able to select one or more of the action candidates to be performed for responding the message of the sender.

Referring to FIG. 2, at block 201, processing logic receives a message or an incoming call from a sender or caller over a network. For the purposes of illustration only, a phone call is used as an example of a communication message. At block 202, processing logic searches in a first database (e.g., caller oriented database) for historical transactions associated with the caller with respect to an organization or enterprise entity in which a recipient is an employee. At block 203, substantially after that, processing logic searches in the identified database out of block 202, for historical transactions associated with the recipient with respect to the caller. At block 204, processing logic generates a list of candidate actions based on search results. At block 205, the list of candidate actions is presented to a recipient or user to allow the user to select one or more actions from the list as a part of handling the incoming call or message. Other operations may also be performed.

Figure 3:
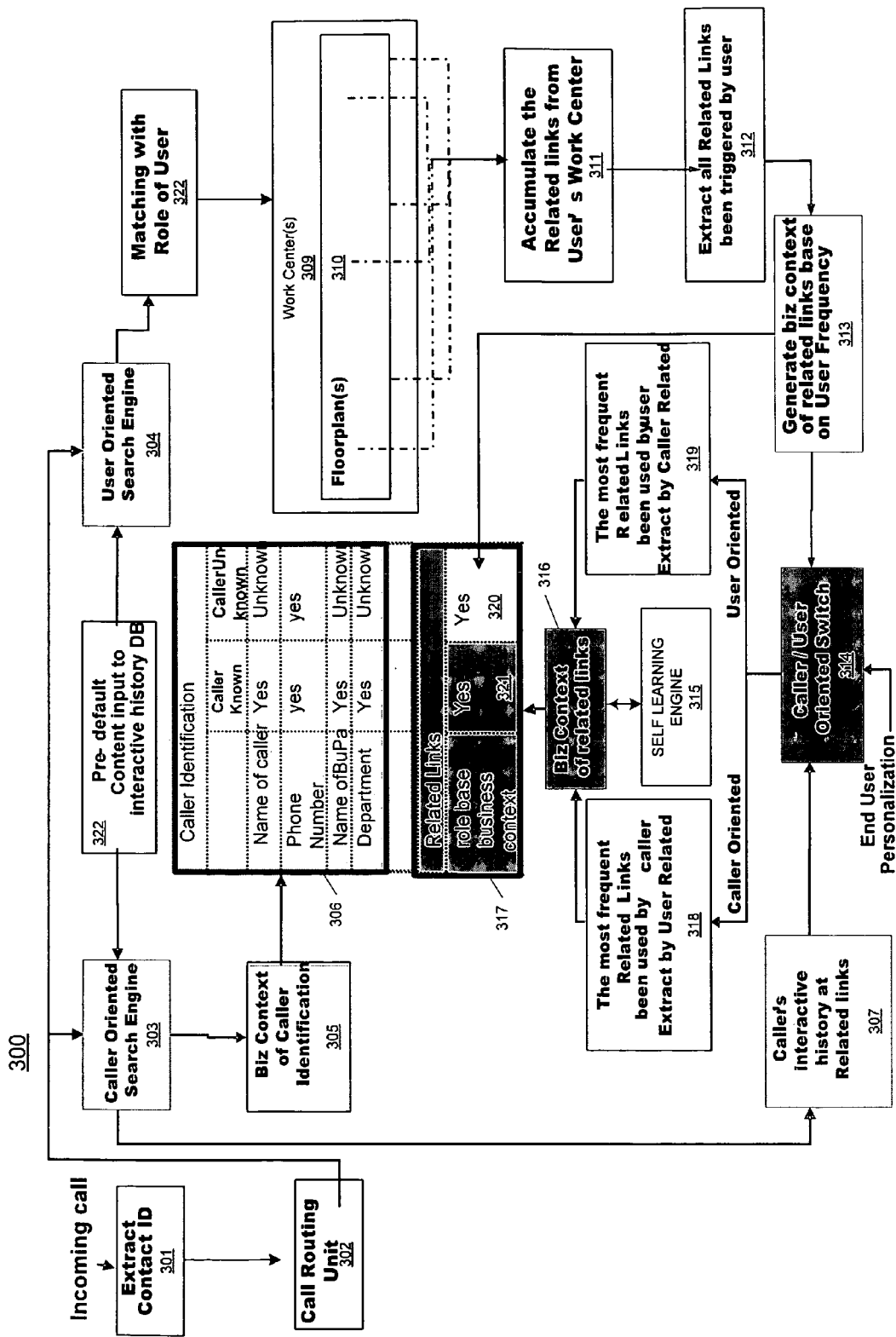
FIG. 3 is a diagram illustrating a process for processing an incoming message according to an alternative embodiment of the invention.

FIG. 3 is a diagram illustrating a process for processing an incoming message according to an alternative embodiment of the invention. Note that process 300 may be performed by processing logic which may include software, hardware, or a combination of both. For example, process 300 may be performed by one or more functional units of system 100 of FIG. 1.

Referring to FIG. 3, according to one embodiment, when an incoming call is received, at block 301, caller's identity (ID) is extracted from the incoming call. For example, caller's caller ID or SIP (session initiate protocol) address may be extracted from the incoming call. The caller's ID is then routed by call routing unit 302 to caller oriented search engine 303 or user oriented search engine 304. Based on caller's ID, caller oriented search engine 303 generates a business context 305 associated with the caller, for example, based on information retrieved from a caller profile maintained by the system and identified by the caller's ID. In one embodiment, caller oriented search engine 303 may access a caller oriented database for such operations. The business context 305 of the caller may include the name and phone number of the caller as shown in block 306. In addition, according to one embodiment, caller oriented search engine 303 further generates caller's interactive history of related links 307.

Further, according to one embodiment, at block 308, user oriented search engine 304 may match any users having roles that are associated with the caller based on caller's ID. In one embodiment, user oriented search engine 304 may access the identified caller database for such operations. For example, user oriented search engine 304 may match users based on the types of business associated with the caller and/or caller's localities (e.g., regions or countries), etc. The matched or identified users may have certain responsibilities that match caller's characteristics. As a result, related links associated with the user or users in view of the caller may be generated. Please note that there is a difference between starting an initial search out of caller oriented database and out of user oriented search.

According to certain embodiments, the related links associated a user may be collected or accumulated at block 311 from the work centers 309 and/or floor plans 310 of the work centers 309. From the accumulated related links of a user, at block 312, all related links that have been triggered by the respective user are extracted. At block 313, a business context of the extracted related links is generated. In one embodiment, only certain related links that are most frequently triggered by the user may be used to generate the business context (e.g., user oriented business context). In one embodiment, such a context may be used in a related links 317 when a caller is unknown (e.g., unknown caller ID or the caller has not done any business with the enterprise entity) as part 320 of context 317.

In addition, context 313 and context 307 may be used or selected at block 314 by a user to generate business context 316 of related links, such as the most frequent related links triggered by a caller and extracted by the user related links 318 or the most frequent related links triggered by a user and extracted by caller related links 319. Context 316 may be used to provide information on part 321 of related links 317, when a caller is known. Furthermore, a self learning engine 315 may be used to generate context 316 based on the related links 307 and 313.

Figure 4:
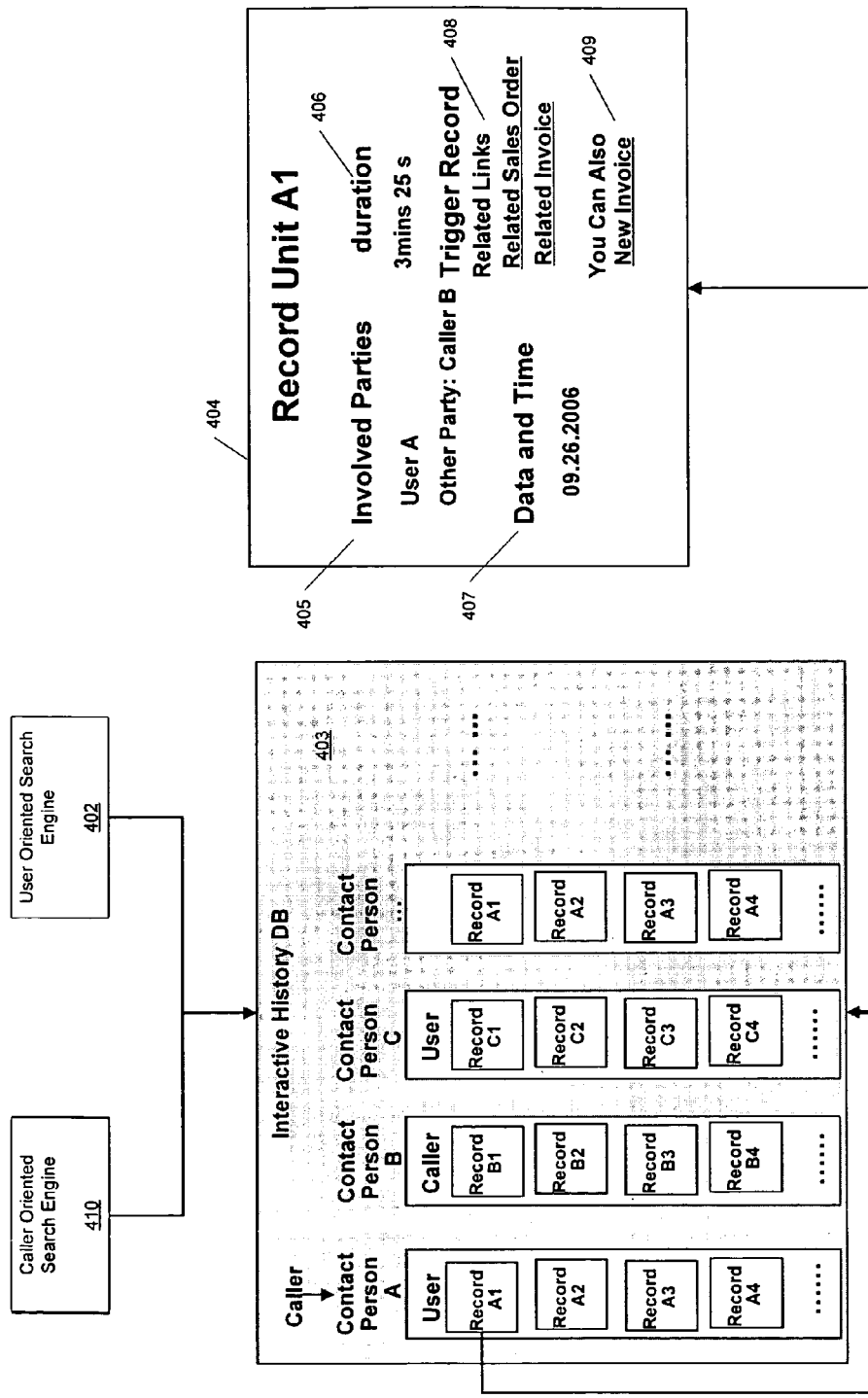
FIG. 4 is a block diagram illustrating a database used during processing an incoming call according to one embodiment of the invention.

FIG. 4 is a block diagram illustrating a database used during processing an incoming call according to one embodiment of the invention. Referring to FIG. 4, in one embodiment, both caller oriented search engine 401 and user oriented search engine 402 are used to store the interactive data derived from the calls between a caller and a user in a database 403, which may be a single database or multiple databases located locally or remotely.

In one embodiment, database 403 may be organized at contact person's folder base. For each contact person, the database 403 establishes a specific folder, where some or all of the interactive history related to the respective contact person are stored in the folder. In one embodiment, the interactive history may be divided into at least two segments. A first segment is user based (e.g., a user receives the call and triggers the interactive history to other contacts). A second segment is caller based (e.g., caller triggers the incoming call and user receives it).

For example, when an incoming call is received from a customer (e.g., a caller), context search is conducted first to identify a user business context database. Then the caller related links is filtered out from the user business context database with a sequence based on the frequency and/or more recent transactions. Thereafter, the related links as a business context is shown at a user interface such that a user can select either of them to view it.

In one embodiment, database 403 includes a set of record units, including unit 404 as an example. In one embodiment, record unit 404, as an example, includes, but is not limited to, a profile of the involved communication parties 405, time 407 and duration 406 of each communications, trigger record (e.g., clicking record of related links 408 or "You can also" links 409) based on one or more predetermined or pre-defaulted content.

In one embodiment, a pre-defaulted content is a link through which a user can access a defined business object. The business object may be further extracted by a caller or a user before it is shown in a user interface (e.g., a portal). Based on the interactive history record unit, the system can extract the user desired business context through a self-learning process performed by a self-learning engine, such as self-learning engine 315 of FIG. 3. The pre-default content will be installed during business configuration. Of course, user may also possible to choose a limited content for his/her communication business context database.

Referring back to FIG. 3, a self-learning process is built upon a personalization switch trigger pattern and an interactive history database extraction pattern (e.g., blocks 314, 316, and 318-319). Caller oriented search engine 303 and user oriented search engine 304 may aggregate most or all of the interactive history that have been triggered by a user or caller.

According to one embodiment, interactive history database extraction pattern may include, but it is not limited to, extracting a contact person through caller's phone number or SIP address, extracting a contact person's interactive history database based on the defined contact person, and extracting the triggering record with sequence by frequency or by date and time, out of the interactive history database (based on one or more configuration rules). Under the condition of extracting by frequency, and there are two or more trigger records at the same frequency, the date and time may be further extracted to be used as a priority factor.

According to a further embodiment, a personalization switch trigger pattern may include extracting a contact person through caller's phone number or SIP address, extracting a contact person's personalization switch record based on a defined contact person, and listing the switch record by frequency or by date and time (based on one or more configuration rules). Under the condition of extracting by frequency, and there are two or more switch records at the same frequency, the date and time may be further extracted to be used as a priority factor.

In one embodiment, a self-learning process is started by a personalization switch trigger pattern after identifying a caller. For different callers, the self-learning process generates a user preference for a caller oriented or user oriented search based on the personalization switch trigger pattern. Thereafter, the interactive history database extraction pattern may be performed to further identify the associated business context.

When a caller is known, according to one embodiment, the business context of the respective call is searched via the caller oriented search engine as default or user oriented based on user preference. When a caller is unknown, it is not feasible to search via caller oriented search engine. In this situation, the business context may be searched based on user oriented information (e.g., extracting the most frequent trigger records that the user had done previously). In one embodiment, pre-defaulted content 322 may be used as inputs to the database based on the roles of the caller and user (e.g., a customer vs. sales representative). Other configurations may exist.

Action Prediction Embodiments

According to certain embodiments, an action predictor is designed to generate the possible action links to a user who is in communication with a specified caller. The action predictor is built upon a user oriented search engine as well as a caller oriented search engine. Similar those described above, in one embodiment, a user oriented search engine is configured to search user related actions from a user's work center, including work center's floor plan(s). Thereafter, BO (business object) related "You can also" may be extracted based on one or more rules, such as, for example, the most frequent used links.

In one embodiment, a caller oriented search engine is configured to search the caller and user related links from the caller's interactive history recorded by a caller's transaction database. The related links may be extracted based on one or more rules (e.g. the most frequent related links that the caller interacted with the user). Further functionalities may be added into the system, including: 1) key words catcher from a voice interactive application, which may generate the possible action links; 2) guided actions as next operation; 3) switch for a user to select user oriented or caller oriented action links; and 4) business configuration for setting of user oriented or caller oriented business context.

Figure 6:
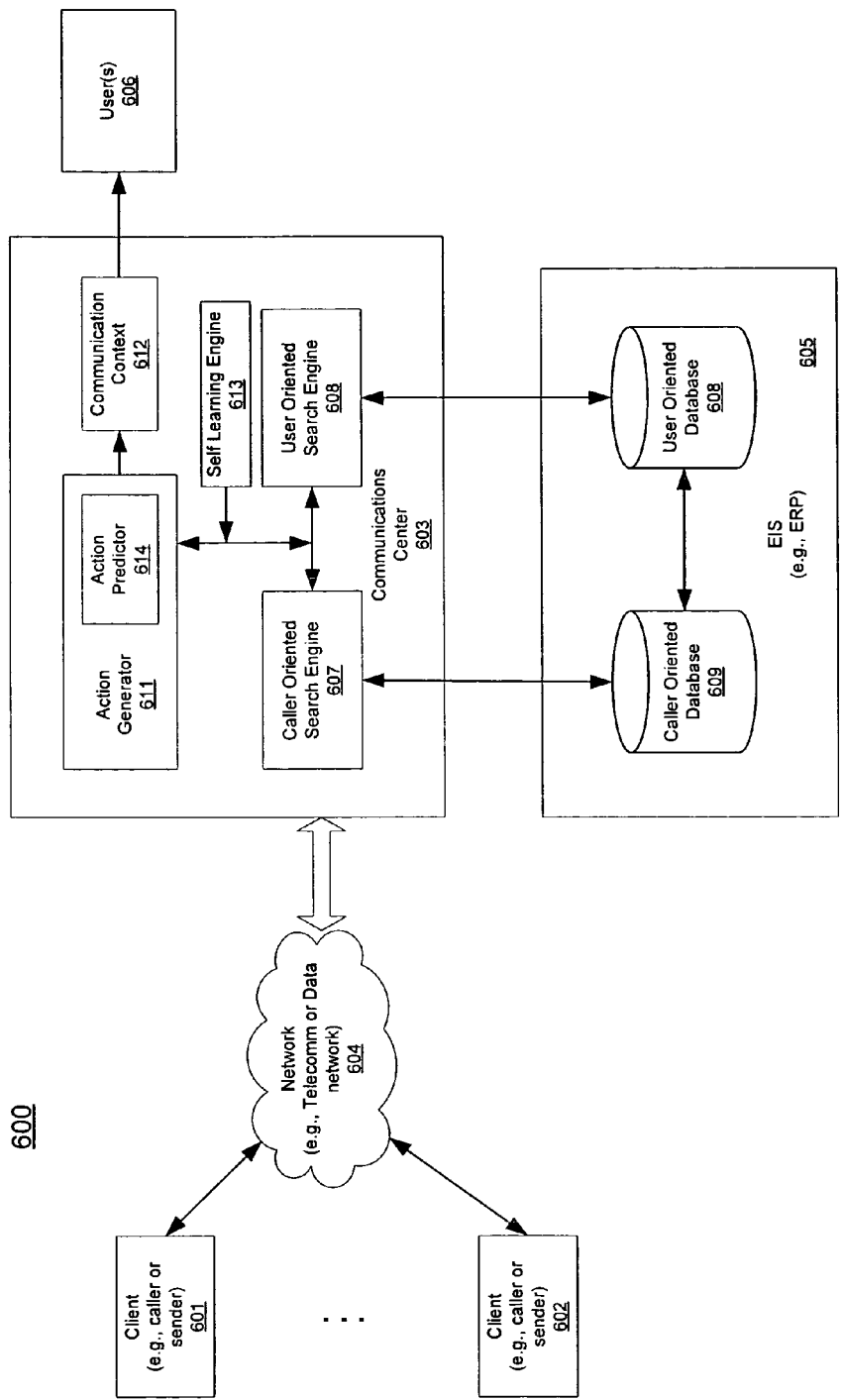
FIG. 6 is a block diagram illustrating a system configuration for handling a communication message according to one embodiment of the invention.

FIG. 6 is a block diagram illustrating a system configuration for handling a communication message according to one embodiment of the invention. In one embodiment, system 600 includes, but is not limited to, a processing logic, in response to a message to be received by a recipient from a sender over a network, to determine one or more previous transactions associated with the sender and the recipient, the one or more previous transactions being recorded during course of operations performed within an entity associated with the recipient, an action generator coupled to generate one or more actions required to be taken based on the determined one or more previous transactions, and an action predictor coupled to generate a list of one or more action candidates based on the determined one or more previous transactions, wherein the one or more action candidates are optional actions recommended to the recipient, in addition to the one or more required actions in response to the message.

Referring to FIG. 6, system 600 includes one or more clients 601-602 communicatively coupled to a server 603 over a network 604. For the purposes of illustration, clients 601-602 are callers communicatively coupled to a communication center 603 which may be a call center associated with an organization or enterprise entity. For example, callers 601-602 may be customers of an enterprise entity owning and/or operating communication center 603. One or more users 606 may be employees or customer representatives of the enterprise entity. The users 606 may be receiving calls from callers 601-602 over a network, which may be a PSTN (public switch telephone network) or a data network (e.g., Internet using voice over IP or VoIP technologies).

In one embodiment, communication center 603 may be communicatively coupled to an enterprise information system (EIS) 605 associated with the enterprise entity. An EIS is used to maintain information regarding operations of an enterprise entity. For example, an EIS may be part of an enterprise resource planning (ERP) system. In one embodiment, server 603 may include an action generator 611 coupled to a caller oriented search engine 607 and user oriented search engine 608, in response to an incoming call received from a caller (e.g., callers 601-602) over a network, to generate a communication context 612 that is related to a caller and/or a potential user 606 (e.g., a recipient) who handles the incoming call.

In one embodiment, in response to an incoming call, caller oriented engine 607 and/or user oriented search engine 608 perform a search or searches within one or more databases (e.g., databases 609-610) for storing information regarding business transactions associated with the caller and/or potential users. For example, a search engine may search and identify one or more users that may be suitable for handling an incoming call of a particular caller based on certain factors associated with the caller and/or the users.

In one embodiment, caller oriented search engine 607 may access a respective caller oriented database 609 and user oriented search engine 608 may access a respective user oriented database 610. Databases 609-610 may be maintained by an enterprise information system (EIS), which may be an ERP system. Note that databases 609 and 610 are shown for the purposes of illustration only, where they may be a single database or multiple databases. In addition, search engines 607-608 may be part of EIS 605 dependent upon specific implementations. Furthermore, server 603 and EIS 605 may be implemented as the same server or a cluster of servers. Similarly, search engines 611-612 may be the same search engine searching in the same database or different databases. Other configurations may exist.

In one embodiment, in response to an incoming call, caller oriented search engine 607 generates a call context (e.g., business related context) associated with the caller based on the incoming call including, for example, caller's name and phone number, as well as a type of business associated with the caller, etc.

In addition, according to one embodiment, in response to an incoming call, caller oriented search engine 607 searches within caller oriented database 609 for any information related to previous transaction between the caller and the enterprise entity associated with the communication center 603 and/or EIS 605. Based on the information as a result of the search, a first business context associated with the caller's previous transactions on related links is generated. This is the caller oriented business context database.

Further, according to another embodiment, in response to the incoming call, user oriented search engine 608 searches within user oriented database 610 for any information related to previous activities performed by a user or users within the enterprise entity. Such activities may be related to certain roles of the user or users over course of operations within the enterprise entity. Based on the information as a result of the search, a second business context associated with the user's previous activities on related links is generated.

Based on the first and second business contexts, a user who handles the incoming call may utilize one or both of the related link contexts (e.g., related link context 1001 of FIG. 10), in addition to the general context associated with the caller, to handle the incoming call. In a further embodiment, the related link context may be generated by a self-learning engine based on the first and second business contexts. The self-learning engine may perform such a determination based on one or more rules.

Furthermore, according to one embodiment, system 600 further includes an action predictor 614, which may be implemented as part of action generator 611 or a separate functional unit communicatively coupled to action generator 611. Action predictor 614 may be configured to generate additional action items to be recommended (e.g., optionally) to a user, in addition to those required, in handling the incoming call. Action predictor 614 may reply on certain information extracted from the incoming call, outcomes of the search engines 607 and/or 608, as well as an outcome of self-learning engine 613. As a result, a user can perform certain required actions and certain actions that "you can also" perform as shown as actions 1002 of FIG. 10. Note that some or all of the functional units associated with server 603 and 605 may be implemented in software, hardware, or a combination of both. Other configurations may exist.

Figure 7:
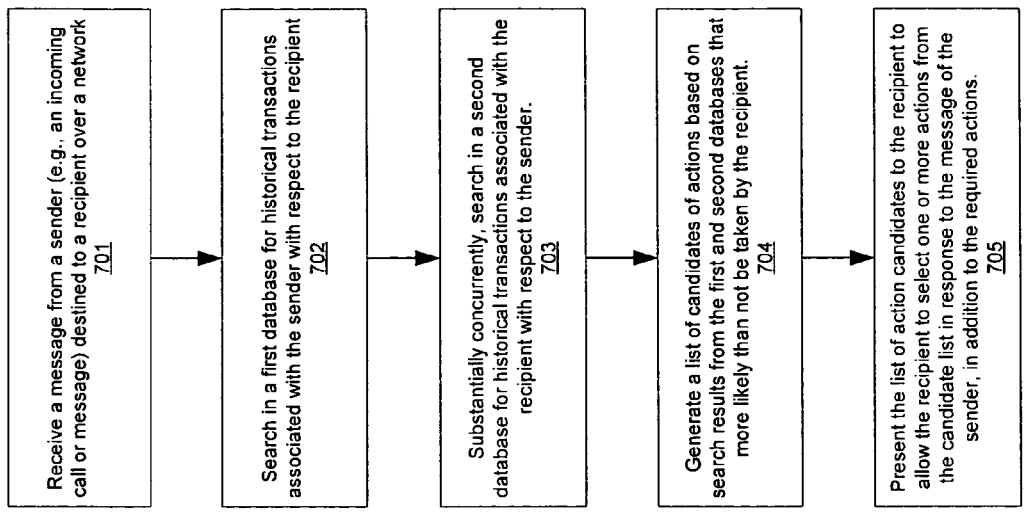
FIG. 7 is a flow diagram illustrating a process for handling an incoming message or call according to one embodiment of the invention.

FIG. 7 is a flow diagram illustrating a process for handling an incoming message or call according to one embodiment of the invention. Note that process 700 may be performed by processing logic which may include software, hardware, or a combination of both. For example, process 700 may be performed by one or more functional units of system 600 of FIG. 6. In one embodiment, process 700 includes, but is not limited to, in response to a message to be received by a recipient from a sender over a network, determining one or more previous transactions associated with the sender and the recipient, the one or more previous transactions being recorded during course of operations performed within an entity associated with the recipient, and generating a list of one or more action candidates based on the determined one or more previous transactions, wherein the one or more action candidates are optional actions recommended to the recipient, in addition to one or more actions required to be taken in response to the message.

Referring to FIG. 7, at block 701, processing logic receives a message from a sender (e.g., an incoming call from a caller) to be received by a recipient or user of an enterprise entity or organization. At block 702, processing logic searches in a first database (e.g., caller oriented database) for historical transactions associated with the sender with respect to a recipient. At block 702, substantially concurrently, processing logic based on the identified database (e.g., user oriented database) for historical transactions associated with the recipient (e.g., in view of roles of the user within the enterprise entity). Note that, for searching the possible actions out of a database, the user oriented database will be utilized as default, then will further filter by caller. At block 703, processing logic generates a list of action candidates based on search results of searches in the user oriented database databases that more likely than not be taken by the user (e.g., optional that "you can also" perform action items). At block 705, the action candidates are presented to the user for selection, in addition to those required actions to be taken or the related links. Other operations may also be performed.

Figure 8:
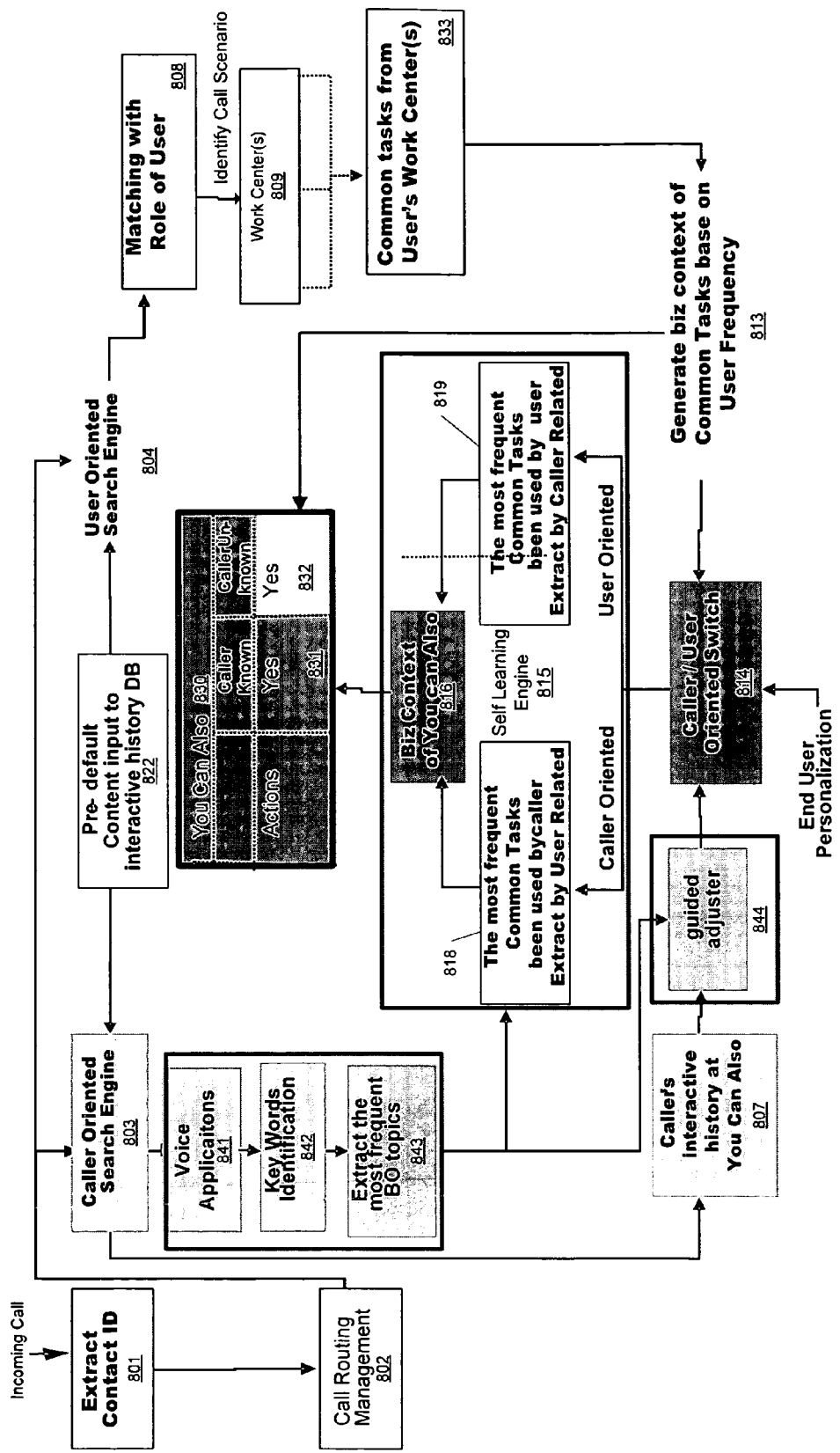
FIG. 8 is a flow diagram illustrating a process for handling an incoming message or call according to an alternative embodiment.

FIG. 8 is a flow diagram illustrating a process for handling an incoming message or call according to an alternative embodiment. Note that process 800 may be performed by processing logic which may include software, hardware, or a combination of both. For example, process 800 may be performed by one or more functional units of system 600 of FIG. 6.

Referring to FIG. 8, according to one embodiment, when an incoming call is received, at block 801, caller's identity (ID) is extracted form the incoming call. For example, caller's caller ID or SIP (session initiate protocol) address may be extracted from the incoming call. The caller's ID is then routed by call routing unit 802 to user oriented search engine and 804 and caller oriented search engine 803. Based on market research, the actions out of a communication is more dependent upon user rather than caller, Based on caller's ID, user oriented search engine 804 generates a business context associated with the user, then further extract by caller, for example, based on information retrieved from a caller profile maintained by the system and identified by the caller's ID, similar to the one described above. In one embodiment, user oriented search engine 803 may access a user oriented database for such operations. The business context of the user may include the name and phone number of the user. In addition, according to one embodiment, user oriented search engine 804 further generates user's interactive history of optional actions or "you can also" action items 813.

Further, according to one embodiment, at block 808, under the condition of an incoming call which is in lost, user oriented search engine 804 may match any users having similar roles that are associated with the caller based on caller's ID. In one embodiment, user oriented search engine 804 may access a user oriented database for such operations. For example, user oriented search engine 804 may match users based on the types of business associated with the caller and/or caller's localities (e.g., regions or countries), etc. The matched or identified users may have certain responsibilities that match caller's characteristics. As a result, related links associated with the user or users in view of the caller may be generated.

According to certain embodiments, the related links associated a user may be collected or accumulated from the work centers 809 and/or floor plans of the work centers 809. From the accumulated related links of a user, all related links that have been triggered by the respective user are extracted. In one embodiment, at block 833, certain common tasks performed by a particular user may be extracted from user's respective work center or centers. At block 813, a business context of the extracted related links is generated. In one embodiment, only certain related links that are most frequently triggered by the user may be used to generate the business context (e.g., user oriented business context). In one embodiment, such a context may be used in a "you can also" context 830 when a caller is unknown (e.g., unknown caller ID or the caller has not done any business with the enterprise entity) as part 832 of context 830.

In addition, context 813 and context 807 may be used or selected at block 814 by a user to generate business context 816 of "you can also" links, such as the most frequent related links triggered by a caller and extracted by the user related links 818 or the most frequent related links triggered by a user and extracted by caller related links 819. Context 816 may be used to provide information on part 831 of "you can also" links 830, when a caller is known. Furthermore, a self learning engine 815 may be used to generate context 816 based on the related links 807 and 813.

Further, according to another embodiment, system 840 further includes a voice processing unit 840 coupled to the call oriented search engine 803 to further process voice related information. Voice processing unit 840 may be implemented in software, hardware, or a combination of both. In one embodiment, voice processing unit 840 includes, but is not limited to, a voice application (e.g., a voice recognition application) 841, a keyword identifier 842, and BO topic extractor 843. For example, voice application 841 may be used to transform a voice stream into text. Keyword identifier 842 may be used to identify one or more keywords from the converted text. BO topic extractor 843 may be used to extract one or more BO topics based on the identified keywords. Such BO topics may be used by a self-learning engine 815 in determining context 816.

After an incoming call is received, caller oriented search engine 803 identifies the possible business context through both interactive history database (e.g., block 807) and a voice processing system 840. Through a self-learning process performed by a self-learning engine 815 based on information retrieved from the interactive history database, the system generates the most recommended actions for a user to consider. Through voice processing system 840, the system also generates additional recommended actions.

According to a further embodiment, system 800 further includes a guided adjuster 844 to further adjust certain guided actions generated by the voice processing unit 840 in view of the caller interactive history context 807, in order generate actions to better fit a real-life business scenario.

In one embodiment, system 900 further provides a pre-default content 822 based on a business role or scenario. A part of content is in line with common tasks out of one or more work centers or the "you can also" actions out of one or more business object floor plans, another part of content is base on specified Business Object instance which are related with possible communication scenarios.

With voice processing system 840, content of business context may be different for one user who talks with the same caller or customer at different time. Since voice processing system 840 generates a new reference point referencing which business process stage that the scenario is staying.

For an unknown caller (e.g., caller ID or SIP address cannot be obtained from the incoming call or message), the same user may have the same business context at "you can also" actions; however, it may be different dependent upon a result of the self-learning process based on the interactive history database. Other configurations may exist.

Figure 9:
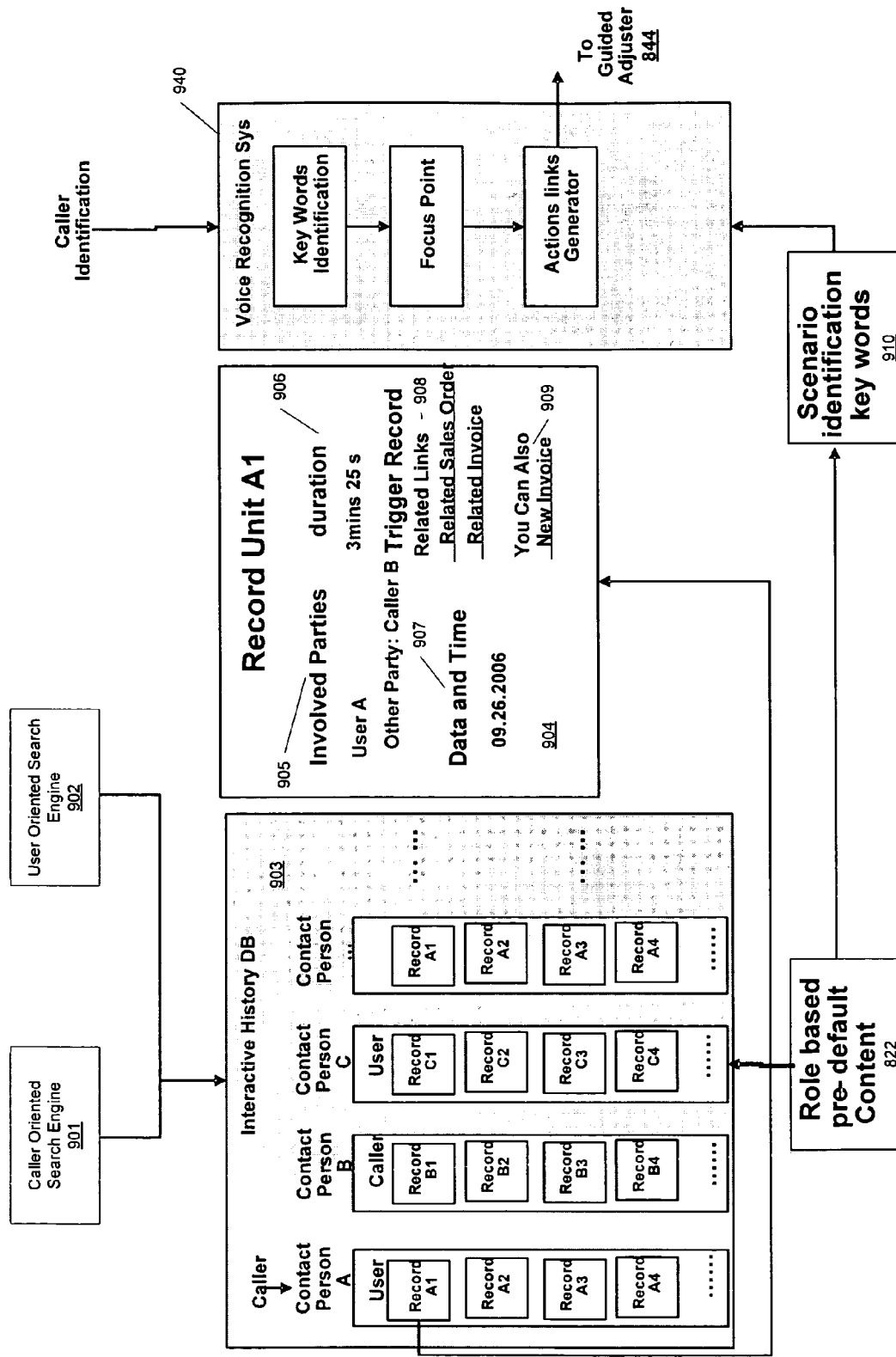
FIG. 9 is a block diagram illustrating a database used during processing an incoming call according to one embodiment of the invention.

FIG. 9 is a block diagram illustrating a database used during processing an incoming call according to one embodiment of the invention. Referring to FIG. 9, in one embodiment, both caller oriented search engine 901 and user oriented search engine 902 are used to store the interactive data derived from the calls between a caller and a user in a database 903, which may be a single database or multiple databases located locally or remotely.

In one embodiment, database 903 may be organized at contact person's folder base. For each contact person, the database 903 establishes a specific folder, where some or all of the interactive history related to the respective contact person are stored in the folder. In one embodiment, the interactive history may be divided into at least two segments. A first segment is user based (e.g., a user receives the call and triggers the interactive history to other contacts). A second segment is caller based (e.g., caller triggers the incoming call and user receives it).

In one embodiment, database 903 includes a set of record units, including unit 904 as an example. In one embodiment, record unit 904, as an example, includes, but is not limited to, a profile of the involved communication parties 905, time 907 and duration 906 of each communications, trigger record (e.g., clicking record of related links 908 or "you can also" links 909) based on one or more predetermined or pre-defaulted content such as content 822.

In one embodiment, a pre-defaulted content is a link through which a user can access a defined business object. The business object may be further extracted by a caller or a user before it is shown in a user interface (e.g., a portal). Based on the interactive history record unit, the system can extract the user desired business context through a self-learning process performed by a self-learning engine, such as self-learning engine 815 of FIG. 8. In addition, the pre-defaulted content may be used to identify a business scenario at block 910 to assist the voice recognition system 840 to generate additional recommended actions, as a part of "you can also" action items.

Referring back to FIG. 8, a self-learning process is built upon a personalization switch trigger pattern and an interactive history database extraction pattern (e.g., blocks 814, 816, and 818-819). Caller oriented search engine 803 and user oriented search engine 804 may aggregate most or all of the interactive history that have been triggered by a user or caller.

According to one embodiment, interactive history database extraction pattern may include, but it is not limited to, extracting a contact person through caller's phone number or SIP address, extracting a contact person's interactive history database based on the defined contact person, and extracting the triggering record with sequence by frequency or by date and time, out of the interactive history database (based on one or more configuration rules). Under the condition of extracting by frequency, and there are two or more trigger records at the same frequency, the date and time may be further extracted to be used as a priority factor.

According to a further embodiment, a personalization switch trigger pattern may include extracting a contact person through caller's phone number or SIP address, extracting a contact person's personalization switch record based on a defined contact person, and listing the switch record by frequency or by date and time (based on one or more configuration rules). Under the condition of extracting by frequency, and there are two or more switch records at the same frequency, the date and time may be further extracted to be used as a priority factor.

In one embodiment, a self-learning process is started by a personalization switch trigger pattern after identifying a caller. For different callers, the self-learning process generates a user preference for a caller oriented or user oriented search based on the personalization switch trigger pattern. Thereafter, the interactive history database extraction pattern may be performed to further identify the associated business context.

When a caller is known, according to one embodiment, the business context of the respective call is searched via the caller oriented search engine. When a caller is unknown, it is not feasible to search via caller oriented search engine. In this situation, the business context may be searched based on user oriented information (e.g., extracting the most frequent trigger records that the user had done previously). In one embodiment, pre-defaulted content 322 may be used as inputs to the database based on the roles of the caller and user (e.g., a customer vs. sales representative). Other configurations may exist.

Figure 11:
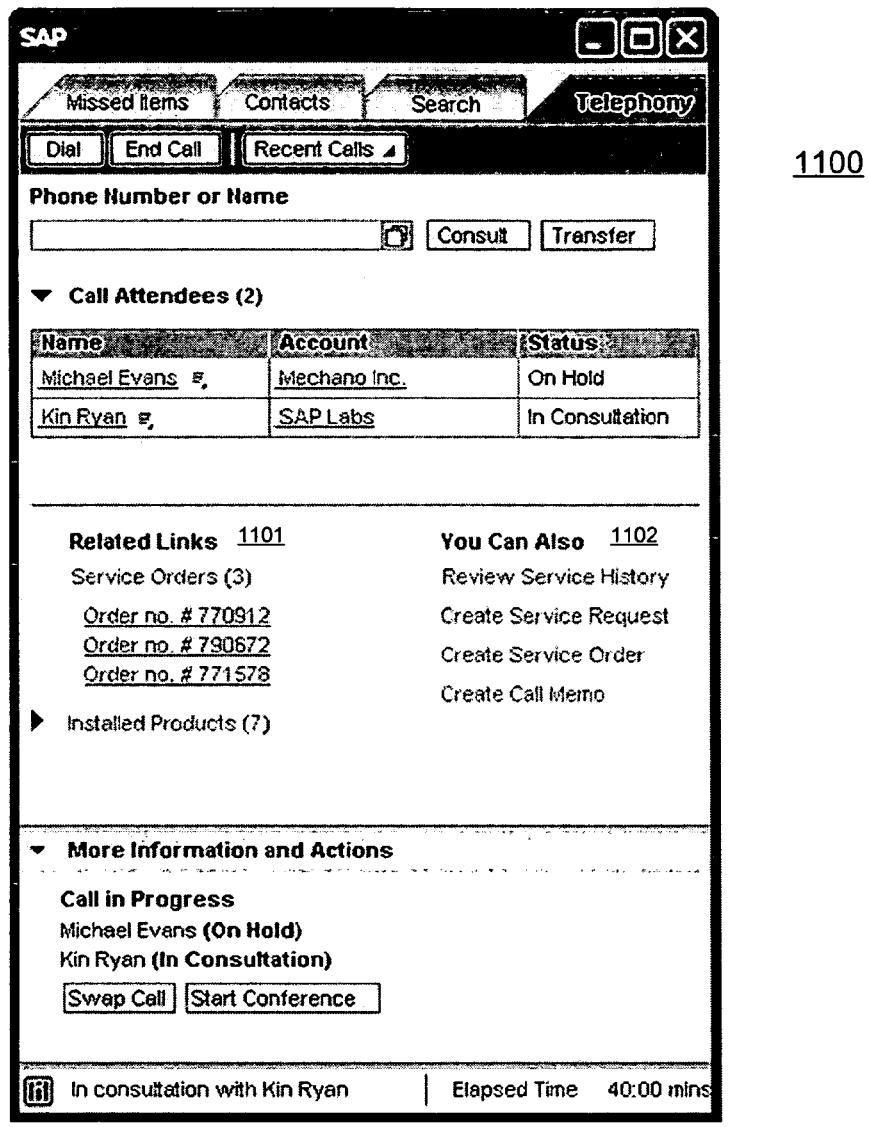
FIG. 11 is a diagram illustrating a user interface for presenting information for processing an incoming call or message according to one embodiment.

FIG. 11 is a diagram illustrating a user interface for presenting information for processing an incoming call or message according to one embodiment. For example, GUI 1100 may be used with systems as described above, such as, for example, system 100 of FIG. 1 and/or system 600 of FIG. 6. As shown in GUI 1100 of FIG. 11, related link information 1101 and "you can also" information 1102 may be generated and presented. Note that the GUI 1100 is shown for illustration purposes only; other formats or layouts of the GUIs may also be implemented.

Example of Data Processing System

Figure 12:
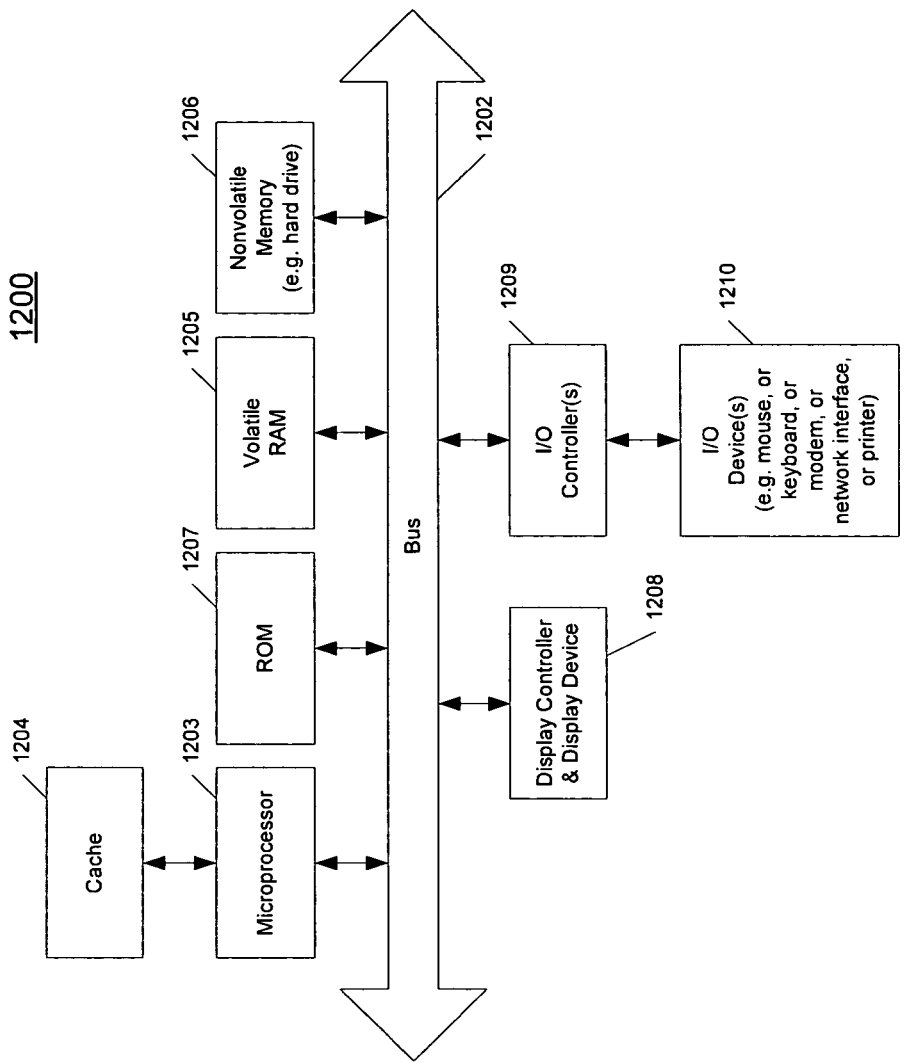
FIG. 12 is a block diagram of a digital processing system, which may be used with one embodiment of the invention.

FIG. 12 is a block diagram of a digital processing system, which may be used with one embodiment of the invention. For example, the system 1200 may be used as a client and/or a server as described above with respect to FIGS. 1 and 6. Note that while FIG. 12 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention.

As shown in FIG. 12, the system 1200, which is a form of a data processing system, includes a bus or interconnect 1202 which is coupled to one or more microprocessors 1203 and a ROM 1207, a volatile RAM 1205, and a non-volatile memory 1206. The microprocessor 1203, which may be, for example, a PowerPC microprocessor or an Intel compatible processor, is coupled to cache memory 1204 as shown in the example of FIG. 12. The bus 1202 interconnects these various components together and also interconnects these components 1203, 1207, 1205, and 1206 to a display controller and display device 1208, as well as to input/output (I/O) devices 1210, which may be mice, keyboards, modems, network interfaces, printers, and other devices which are well-known in the art.

Typically, the input/output devices 1210 are coupled to the system through input/output controllers 1209. The volatile RAM 1205 is typically implemented as dynamic RAM (DRAM) which requires power continuously in order to refresh or maintain the data in the memory. The non-volatile memory 1206 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 12 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 1202 may include one or more buses connected to each other through various bridges, controllers, and/or adapters, as is well-known in the art. In one embodiment, the I/O controller 1209 includes a USB (Universal Serial Bus) adapter for controlling USB peripherals. Alternatively, I/O controller 1209 may include an IEEE-1394 adapter, also known as FireWire adapter, for controlling FireWire devices.

Overview of EIS and ERP Systems

An EIS, which may be used in embodiments of the invention described above, is generally any kind of computing system that is of "enterprise class". This means typically offering high quality of service, dealing with large volumes of data (e.g., capable of supporting some relatively large organization, also referred to as an "an enterprise").

EIS systems provide a technology platform that enables organisations to integrate and coordinate their business processes. They logically provide a single system that is central to the organisation and ensure that information can be shared across all functional levels and management hierarchies. Enterprise systems are invaluable in eliminating the problem of information fragmentation caused by multiple information systems in an organisation, by creating a standard data structure.

An EIS would typically be operated by professional system administrators and be deployed on a dedicated server or servers. It would typically offer network connectivity and provide services that supported the operations carried out by the enterprise. For example, an EIS may include an enterprise resource planning (ERP) system. ERP systems integrate (or attempt to integrate) most or all data and processes of an organization into a logically unified system. A typical ERP system uses multiple components of computer software and/or hardware to achieve the integration. A key ingredient of most ERP systems is the use of a logically single, unified database to store data for the various system modules, although the databases or data may be managed locally or remotely across a network or networks.

The term ERP originally implied systems designed to plan the utilization of enterprise-wide resources. Although the acronym ERP originated in the manufacturing environment, today's use of the term ERP systems has much broader scope. ERP systems typically attempt to cover all basic functions of an organization, regardless of the organization's business or charter. Business, non-profit organizations, non governmental organizations, governments, and other large entities utilize ERP systems.

Additionally, it may be noted that to be considered an ERP system, a package (which may include software, hardware, or a combination of both) generally would only need to provide functionality in a single package that would normally be covered by two or more systems. Technically, a package that provides both payroll and accounting functions would be considered an ERP package.

However, the term is typically reserved for larger, more broadly based applications. The introduction of an ERP system to replace two or more independent applications eliminates or reduces the need for external interfaces previously required between systems, and provides additional benefits that range from standardization and lower maintenance (one system instead of two or more) to easier and/or greater reporting capabilities (as all data is typically kept in one database logically).

Examples of modules in an ERP which formerly would have been stand-alone applications include, but is not limited to, manufacturing, supply chain, financials, CRM (customer relation management), human resources, and warehouse management, etc. ERPs are cross-functional and enterprise-wise. All functions departments that are involved in operations or production are integrated in one system (logically). In addition to manufacturing, warehousing, logistics, and information technology (IT), this would including accounting, human resources, marketing, and strategic management.

Best practices are also a benefit of implementing an ERP system. When implementing an ERP system, organizations essentially had to choose between customizing the software or modifying their business processes to the "best practice" functionality delivered in the vanilla version of the software. Best practice is considered by some a business buzzword used to describe the process of developing and following a standard way of doing things that multiple organisations can use for management, policy, and especially software systems.

Consider the use of Best Practice in today's computer systems and particularly MOM (marketing operations menagement) systems. A best practice is chosen (whether it really is the best practice or not!) and implemented into the computer system. This allows multiple organizations performing similar tasks to use the same software for their tasks.

MOM is a vision of end to end marketing optimization, from planning and budgeting, through marketing content management, to global marketing execution and analysis. It is characterized by an attempt to achieve measurable and trackable return on marketing investment (ROMI), and, as a means of achieving that, creating a marketing dashboard. The concept of the marketing dashboard is that a marketing executive, or indeed any employee of an organization, can log in to a system which shows the status of all ongoing marketing activities—showing 'fuel consumption' (spending), 'speed' (sales) and various other metrics in the automotive analogy. The marketing resource management (MRM) industry, including software vendors, provides the software infrastructure to assist organizations with their marketing operations management. This forms the technology backbone to the essential alignment of people, process and technology that is critical to an effective marketing operations management strategy.

Human resources is a good example of best practice as evidenced in most MOM systems. There are an infinite number of ways and a huge number of processes involved in managing an organisation's employees, volunteers, and contractors. By choosing a "best practice" or standard way of organizing and performing processes, the makers of MOM systems or HRMS (human resource management system) software are able to produce systems that can be used by multiple organisations.

Often the benefit of best practice implementation in this context is that organisations who have poorly designed (or more likely evolved) processes are given a choice between a (typically) expensive modification to their system, or choosing to follow a Best Practice. The changing of best practice over time is a major force in ERP system lifecycles. Many major software releases have been prompted by the change or introduction of a best practice within an industry. The rate of enormous technological change over the past century forces rapid adaptation and versatile best practices.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, ABAP, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
    in response to a message to be received by a recipient from a sender over a network, determining, by at least one processor-based device, at least one previous transaction associated with the sender and the recipient, the at least one previous transaction being recorded during course of operations performed within an entity associated with the recipient, wherein determining the at least one previous transaction comprises:
    performing a first search of interactive history records based on an identity of the sender and performing a second search of the interactive history records based on identities of entity users associated with the sender by at least accessing a first database to search first previous transactions associated with the sender with respect to the entity, and
    accessing, substantially concurrently with the accessing of the first database, a second database to search second previous transactions associated with the recipient with respect to the sender, wherein a list of at least one action candidate is generated based on at least one of the first and second previous transactions,
    determining a type of business of the sender and a location of the sender,
    determining at least one role of the recipient within the entity,
    extracting at least one keyword from a communication; and
    generating, by the at least one processor-based device, the list of at least one action candidate based on the determined at least one previous transaction associated with the sender and the recipient and one or more of the following: sender information, recipient information, and the extracted keyword, wherein the at least one previous transaction associated with the sender and the recipient including previous triggered links of at least one of related sales orders and related invoices recorded in the interactive history records for interactions between the sender and the recipient, wherein the at least one action candidate is likely to be taken by the recipient and is an optional action recommended to the recipient, in addition to at least one action required to be taken in response to the message.

2. The method of claim 1, further comprising:
    extracting at least one keyword from the message;
    identifying at least one transaction object that is related to the extracted at least one keyword based on the first previous transactions; and
    generating at least one guided action based on the identified at least one transaction object, wherein at least one action candidate is generated based on the at least one guided action.

3. The method of claim 2, further comprising adjusting the at least one guided action to form the recommended optional action based on at least one behavior of the sender derived from the first previous transactions.

4. The method of claim 2, further comprising:
    generating a first transaction context representing at least one common task performed by the sender based on the first previous transactions and the at least one guided action; and
    generating a second transaction context representing at least one common task performed by the recipient based on the second previous transactions, wherein the at least one action candidate is generated based on at least one of the first and second transaction contexts.

5. The method of claim 4, further comprising recording at least one behavior of the recipient in view of the first and second transaction contexts, wherein the recorded at least one behavior used to generate further recommended actions with respect to the sender and/or recipient.

6. The method of claim 1, wherein the entity is an enterprise entity, and wherein information of the at least one previous transaction is provided from an enterprise information system (EIS) associated with the enterprise entity, the EIS system including at least an enterprise resource planning (ERP) system.

7. A non-transitory machine-readable medium storing instructions therein, which when executed by a machine, cause the machine to perform a method, the method comprising:
 in response to a message to be received by a recipient from a sender over a network, determining, by at least one processor-based device, at least one previous transaction associated with the sender and the recipient, the at least one previous transaction being recorded during course of operations performed within an entity associated with the recipient, wherein determining the at least one previous transaction comprises:
 performing a first search of interactive history records based on an identity of the sender and performing a second search of the interactive history records based on identities of entity users associated with the sender by at least accessing a first database to search first previous transactions associated with the sender with respect to the entity, and
 accessing, substantially concurrently with the accessing of the first database, a second database to search second previous transactions associated with the recipient with respect to the sender, wherein a list of at least one action candidate is generated based on at least one of the first and second previous transactions,
 determining a type of business of the sender and a location of the sender,
 determining at least one role of the recipient within the entity,
 extracting at least one keyword from a communication; and
 generating, by the at least one processor-based device, the list of at least one action candidate based on the determined at least one previous transaction associated with the sender and the recipient and one or more of the following: sender information, recipient information, and the extracted keyword, wherein the at least one previous transaction associated with the sender and the recipient including previous triggered links of at least one of related sales orders and related invoices recorded in the interactive history records for interactions between the sender and the recipient, wherein the at least one action candidate is likely to be taken by the recipient and is an optional action recommended to the recipient, in addition to at least one action required to be taken in response to the message
 in response to a message to be received by a recipient from a sender over a network, determining at least one previous transaction associated with the sender and the recipient, the at least one previous transaction being recorded during course of operations performed within an entity associated with the recipient, wherein determining the at least one previous transaction comprises performing a first search of interactive history records based on an identity of the sender, and performing a second search of the interactive history records based on identities of entity users associated with the sender; and
 generating a list of at least one action candidate based on the determined at least one previous transaction associated with the sender and the recipient, the at least one previous transaction associated with the sender and the recipient including previous triggered links of at least one of related sales orders and related invoices recorded in the interactive history records of interactions between the sender and the recipient, wherein the at least one action candidate is an optional action recommended to the recipient, in addition to at least one action required to be taken in response to the message.

8. The non-transitory machine-readable medium of claim 7, wherein the method further comprises generating the at least one required action based on the at least one previous transaction associated with the sender and the recipient.

9. The non-transitory machine-readable medium of claim 7, wherein determining at least one previous transaction comprises:
 accessing a first database to search first previous transactions associated with the sender with respect to the entity; and
 substantially concurrently accessing a second database to search second previous transactions associated with the recipient with respect to the sender, wherein the list of at least one action candidate is generated based on at least one of the first and second previous transactions.

10. The non-transitory machine-readable medium of claim 9, wherein the method further comprises:
 extracting at least one keyword from the message;
 identifying at least one transaction object that is related to the extracted at least one keyword based on the first previous transactions; and
 generating at least one guided action based on the identified at least one transaction object, wherein at least one action candidate is generated based on the at least one guided action.

11. The non-transitory machine-readable medium of claim 10, wherein the method further comprises adjusting the at least one guided action to form the recommended optional action based on at least one behavior of the sender derived from the first previous transactions.

12. The non-transitory machine-readable medium of claim 10, wherein the method further comprises:
 generating a first transaction context representing at least one common task performed by the sender based on the first previous transactions and the at least one guided action; and
 generating a second transaction context representing at least one common task performed by the recipient based on the second previous transactions, wherein the at least one action candidate is generated based on at least one of the first and second transaction contexts.

13. The non-transitory machine-readable medium of claim 12, wherein the method further comprises recording at least one behavior of the recipient in view of the first and second transaction contexts, wherein the at least one recorded behavior is used to generate further recommended actions with respect to the sender and/or recipient.

14. The non-transitory machine-readable medium of claim 7, wherein the entity is an enterprise entity, and wherein information of the at least one previous transaction is provided from an enterprise information system (EIS) associated with the enterprise entity, the EIS system including at least an enterprise resource planning (ERP) system.

15. A data processing system, comprising:
at least one processor-based device; and
at least one memory device coupled to the at least one processor-based device, the at least one memory device comprising computer instructions that when executed on the at least one processor-based device cause the at least one processor device to at least:
in response to a message to be received by a recipient from a sender over a network, determining, by at least one processor-based device, at least one previous transaction associated with the sender and the recipient, the at least one previous transaction being recorded during course of operations performed within an entity associated with the recipient, wherein determining the at least one previous transaction comprises:
performing a first search of interactive history records based on an identity of the sender and performing a second search of the interactive history records based on identities of entity users associated with the sender by at least accessing a first database to search first previous transactions associated with the sender with respect to the entity, and
accessing, substantially concurrently with the accessing of the first database, a second database to search second previous transactions associated with the recipient with respect to the sender, wherein a list of at least one action candidate is generated based on at least one of the first and second previous transactions,
determining a type of business of the sender and a location of the sender,
determining at least one role of the recipient within the entity,
extracting at least one keyword from a communication; and
generating, by the at least one processor-based device, the list of at least one action candidate based on the determined at least one previous transaction associated with the sender and the recipient and one or more of the following: sender information, recipient information, and the extracted keyword, wherein the at least one previous transaction associated with the sender and the recipient including previous triggered links of at least one of related sales orders and related invoices recorded in the interactive history records for interactions between the sender and the recipient, wherein the at least one action candidate is likely to be taken by the recipient and is an optional action recommended to the recipient, in addition to at least one action required to be taken in response to the message
in response to a message to be received by a recipient from a sender over a network, to determine at least one previous transaction associated with the sender and the recipient, the at least one previous transaction being recorded during course of operations performed within an entity associated with the recipient, wherein determining the at least one previous transaction comprises performing a first search of interactive history records based on an identity of the sender, and performing a second search of the interactive history records based on identities of entity users associated with the sender;
at least one action required to be taken based on the determined at least one previous transaction; and
generate a list of at least one action candidate based on the determined at least one previous transaction associated with the sender and the recipient, the at least one previous transaction associated with the sender and the recipient including previous triggered links of at least one of related sales orders and related invoices recorded in the interactive history records of interactions between the sender and the recipient, wherein the at least one action candidate is an optional action recommended to the recipient, in addition to the at least one required action in response to the message.

16. The system of claim 15, wherein the computer instructions further comprise instructions to cause the at least one processor-based device to:
search within a first database first previous transactions associated with the sender with respect to the entity; and
to substantially concurrently search within a second database second previous transactions associated with the recipient with respect to the sender, wherein the list of at least one action candidate is generated based on at least one of the first and second previous transactions.

17. The system of claim 16, wherein the computer instructions further comprise computer instructions to cause the at least one processor-based device to analyze the message to at least one keyword from the message;
identify at least one transaction object that is related to the extracted at least one keyword based on the first previous transactions; and
generate at least one guided action based on the identified at least one action object, wherein at least one transaction candidate is generated based on the at least one guided action.

18. The system of claim 17, wherein the computer instructions cause the at least one processor-based device to identify at least one keyword out of voice applications and to then search at least one transaction object based on the identified key words, the computer instructions further causing the at least one processor-based device to generate at least one guided action based on the at least one transaction object, and wherein at least one action candidate is generated based on the at least one guided action.

19. The system of claim 17, wherein the computer instructions further comprise instructions to cause the at least one processor-based device to:
generate a first transaction context representing at least one common task performed by the sender based on the first previous transactions and the at least one guided action; and
generate a second transaction context representing at least one common task performed by the recipient based on the second previous transactions, wherein the at least one action candidate is generated based on at least one of the first and second transaction contexts.

* * * * *